United States Patent
Panchal et al.

(10) Patent No.: US 10,548,029 B2
(45) Date of Patent: Jan. 28, 2020

(54) SYSTEMS AND METHODS FOR IDENTIFYING A CELL TYPE AND CELL COMMUNICATION CAPABILITIES FROM CELLULAR BROADCAST DATA

(71) Applicant: Verizon Patent and Licensing Inc., Arlington, VA (US)

(72) Inventors: Jignesh S. Panchal, Hillsborough, NJ (US); Lily Zhu, Parsippany, NJ (US); Yee Sin Chan, San Jose, CA (US); William H. Stone, Doylestown, PA (US); Gregory Dial, Flanders, NJ (US); Ahmed Moussa, Basking Ridge, NJ (US); Christopher M. Schmidt, Branchburg, NJ (US); Michael Kondratiuk, Hillsborough, NJ (US); Gerard J. Flynn, Washington, NJ (US); Balaji L. Raghavachari, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/173,713

(22) Filed: Oct. 29, 2018

(65) Prior Publication Data
US 2019/0335343 A1  Oct. 31, 2019

Related U.S. Application Data

(63) Continuation-in-part of application No. 15/963,714, filed on Apr. 26, 2018.

(51) Int. Cl.
*H04W 4/00* (2018.01)
*H04W 24/02* (2009.01)
(Continued)

(52) U.S. Cl.
CPC ........... *H04W 24/02* (2013.01); *H04W 76/10* (2018.02); *H04W 84/042* (2013.01); *H04W 88/02* (2013.01); *H04W 92/10* (2013.01)

(58) Field of Classification Search
CPC .... H04B 17/318; H04W 8/005; H04W 24/02; H04W 24/10; H04W 48/10; H04W 48/16;
(Continued)

(56) References Cited

U.S. PATENT DOCUMENTS 8,538,421 B2    9/2013  Brisebois et al.
9,456,337 B2 *  9/2016  Amerga ................. H04W 8/22
(Continued)

OTHER PUBLICATIONS

3GPP TS 36.331 V13.8.1, 3rd Generation Partnership Project; Technical Specification Group Radio Access Network; Evolved Universal Terrestrial Radio Access (E-UTRA); Radio Resource Control (RRC); Protocol specification (Release 13), 644 pages, Jan. 2018.*

(Continued)

*Primary Examiner* — Frank Duong

(57) ABSTRACT

A user device receives system information block data from a cell. The user device obtains, from the system information block data, cell metadata that includes a cellular parameter. The user device parses the cell metadata to identify the cellular parameter. The cellular parameter includes an upper layer indicator element, a public land mobile network (PLMN) information list element, and a network capability indicator element. The user device determines, based on the cellular parameter, that the cell is of a particular cell type of a plurality of cell types, and that the cell has a particular capability of a plurality of types of capabilities. The user device performs an action based on the particular cell type or the particular capability.

20 Claims, 8 Drawing Sheets

(51) Int. Cl.
*H04W 76/10* (2018.01)
*H04W 92/10* (2009.01)
*H04W 88/02* (2009.01)
*H04W 84/04* (2009.01)

(58) Field of Classification Search
CPC ... H04W 48/18; H04W 56/001; H04W 76/10; H04W 76/11; H04W 76/15; H04W 88/06
See application file for complete search history.

(56) References Cited

U.S. PATENT DOCUMENTS

| | | |
|---|---|---|
| 2018/0368016 A1 | 12/2018 | Lee et al. |
| 2019/0053136 A1 | 2/2019 | Lee et al. |
| 2019/0069205 A1 | 2/2019 | Lee et al. |
| 2019/0069226 A1 | 2/2019 | Lee et al. |
| 2019/0069229 A1 | 2/2019 | Lee et al. |
| 2019/0069325 A1* | 2/2019 | Yerramalli ........ H04W 74/0833 |
| 2019/0215885 A1* | 7/2019 | Wu ........................ H04W 48/12 |
| 2019/0223091 A1* | 7/2019 | Huang-Fu ............. H04L 5/0064 |
| 2019/0268833 A1* | 8/2019 | Kwok ................... H04W 48/16 |

OTHER PUBLICATIONS

"5G indicator for EN-DC", GPP TSG-RAN WG2 #100, R2-1713443, Ericsson, 21 pages, Dec. 2017.
"Clarification of the UpperlayerIndication in SIB2 (RILNo COO8)", 3GPP TSG-RAN WG2 NR Ad hoc 0118, R2-1801529, CATT, 6 pages, Jan. 2018.
Ericsson, "Introducing 5G indication in LTE RRC SIB", 3GPP TSG-RAN WG2 #99bis, 20 pages, Oct. 2017.

* cited by examiner

SYSTEMS AND METHODS FOR IDENTIFYING A CELL TYPE AND CELL COMMUNICATION CAPABILITIES FROM CELLULAR BROADCAST DATA

RELATED APPLICATION

This application is a continuation-in-part (CIP) of U.S. patent application Ser. No. 15/963,714, filed on Apr. 26, 2018, the content of which is incorporated by reference herein in its entirety.

BACKGROUND

Telecommunications components included in user equipment, such as mobile phones, personal computers, tablet computers, wearable computing devices, and/or the like, can be capable of communicating wirelessly using a radio transmitter and a radio receiver. Different types of radios exist for different forms of wireless communication, including long term evolution (LTE) radios for LTE communications, 3G radios for 3G communications, code division multiple access (CDMA) radios for CDMA communications, and/or the like.

DETAILED DESCRIPTION OF PREFERRED EMBODIMENTS

Figure 1A:
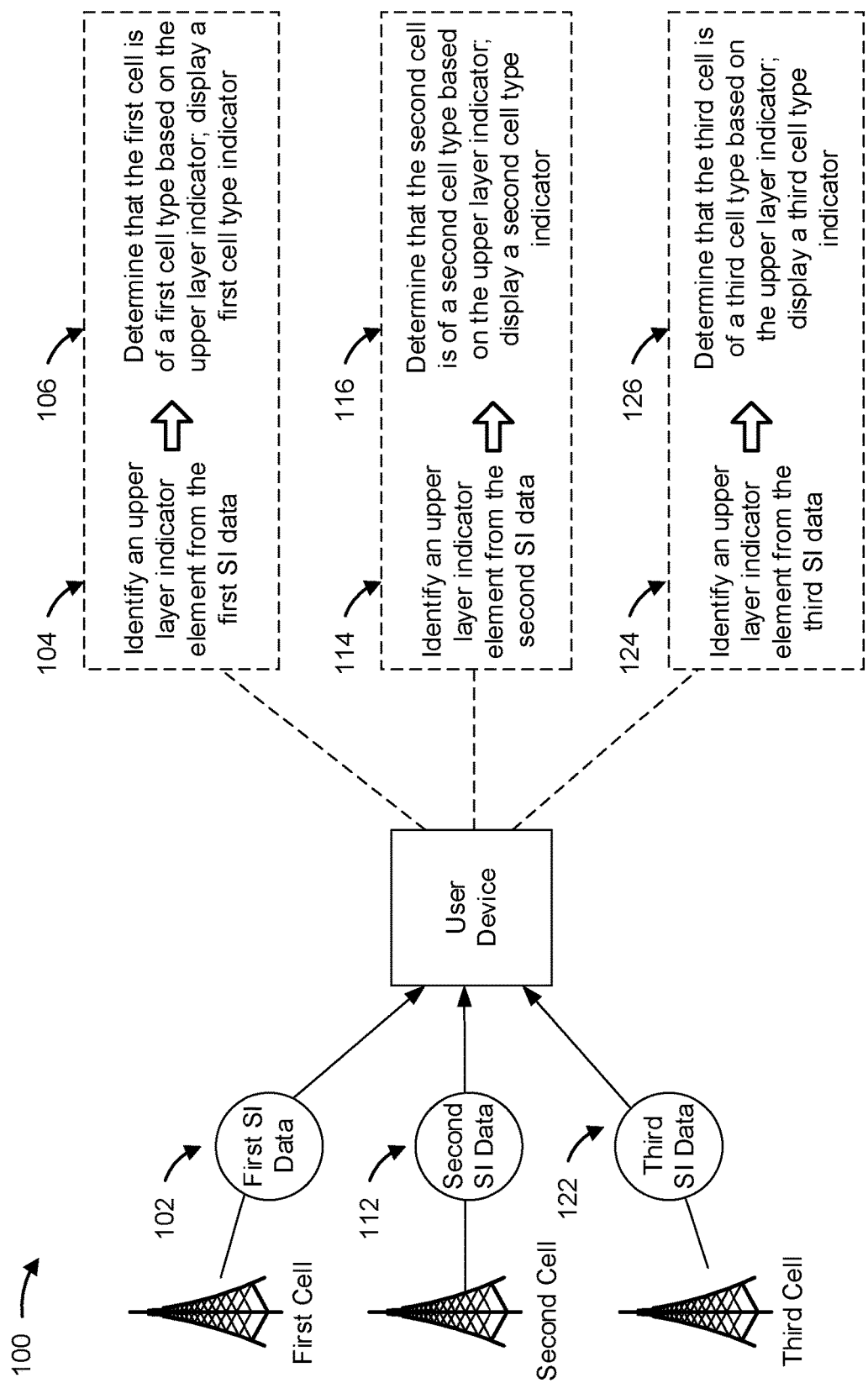
FIGS. 1A-1C are diagrams of example implementations described herein.

The following detailed description of example implementations refers to the accompanying drawings. The same reference numbers in different drawings can identify the same or similar elements.

Often, electronic devices, such as user devices (e.g., user equipment, such as a smart phone, tablet computer, laptop computer, and/or the like) include components for wirelessly communicating with other electronic devices over a variety of radio telecommunications networks operating using a variety of frequencies and protocols. In a situation where a user device communicates with a cellular base station (e.g., to access a telecommunications network), the user device can determine the type of base station to which the user device is connected (e.g., CDMA, third generation (3G), fourth generation (4G) or LTE, fifth generation (5G) or New Radio (NR), and/or the like) based on the modem or radio used by the user device to connect to the base station. However, communications technology can differ in a situation where the same modem or radio is used; for example, a cellular modem or radio can be used in multiple different types of communications technology, including 4G LTE communications, 5G NR communications, 5G NR sub-6 GHz communications, 5G NR millimeter wave (mmWave) communications, and/or the like.

Some implementations, described herein, provide a user device that is capable of using system information (e.g., included in a system information block (SIB)) broadcast by a cell (e.g., a cellular base station) to distinguish between different types of communications technology (e.g., cell types) used by the cell and/or to distinguish between different communication capabilities of the cell. For example, the user device can receive system information (e.g., master information block (MIB) data, first system information block (SIB1) data, second system information block (SIB2) data, third system information block (SIB3) data, and/or the like) from the cell. In some implementations, the system information can include cell metadata (e.g., information capable of being used by the user device for a variety of purposes) that includes one or more cellular parameters, such as an upper layer indicator element (e.g., an upperLayerIndication parameter in the SIB2 data), a public land mobile network (PLMN) information list element (e.g., a PLMN-InfoList parameter in the SIB2 data), a network capability indicator element (e.g., a networkCapabilityinfo parameter in the SIM data), and/or the like. The user device can obtain the cell metadata and identify the one or more cellular parameters.

In some implementations, the user device can determine which type of cell the system information was broadcast from based on a value associated with the one or more cellular parameters. For example, the upper layer indicator element can be associated with a value that indicates whether the cell is of a particular type of cell, such as a 4G LTE cell, a 5G NR cell, a 5G NR sub-6 GHz cell, a 5G NR mmWave cell, and/or the like. In some implementations, the user device can determine which type of cell the system information was broadcast from based on a combination and/or an existence of the one or more cellular parameters. For example, the existence of a PLMN information list element, but not an upper layer indicator element, in the system information can indicate whether the cell is of a particular type of cell, such as a 4G LTE cell, a 5G NR cell, a 5G NR sub-6 GHz cell, a 5G NR mmWave cell, and/or the like. Based on determining what type of cell the system information was broadcast from, the user device can perform one or more actions (e.g., connect to the cell, ignore the cell, display a cell type indicator on a user interface of the user device, and/or the like).

In some implementations, the user device can determine a cell's communication capabilities based on a value associated with the one or more cellular parameters. For example, the network capability indicator element can be associated with a value that indicates whether the cell has a low latency capability, a high latency capability, a low reliability capability, a high reliability capability, a low data rate capability, a high data rate capability, a low traffic density capability, a high traffic density capability, and/or the like. Based on determining the cell's communication capabilities, the user device can perform one or more actions (e.g., connect to the cell, ignore the cell, display a cell capability indicator on a user interface of the user device, and/or the like).

In this way, a user device can determine a cell type (e.g., a specific communications technology) used by a cell and/or one or more capabilities of the cell from information regularly broadcast by the cell (e.g., system information broadcast data), facilitating a variety of actions being taken by the user device. By determining the cell type and/or the one or more capabilities of the cell from system information data, the user device can perform a variety of actions without requiring additional information to be provided by the cell, including connecting to the cell based on the cell type and/or the one or more capabilities of the cell (e.g., prioritizing one type of cell over another), displaying a cell type indicator and/or a cell capabilities indicator (e.g., providing a user of the user device with information indicating which type of cell the user device is in communication with and/or the one or more capabilities of the cell), and/or the like. Several different stages of the process for determining the cell type and/or the one or more capabilities of the cell from cellular broadcast data are automated, which can improve speed and efficiency of the process and conserve computing resources (e.g., processor resources, memory resources, and/or the like). Furthermore, implementations described herein use a rigorous, computerized process to perform tasks or roles that were not previously performed. Finally, automating the process for determining the cell type and/or the one or more capabilities of the cell from cellular broadcast data conserves computing resources (e.g., processor resources, memory resources, and/or the like) that would otherwise be wasted by using multiple different types of communications data and/or devices with different software, protocols, and configurations.

FIG. 1A is a diagram of an example implementation 100 described herein. As shown in FIG. 1A, example implementation 100 includes three cells (e.g., a first cell, a second cell, and a third cell) and a user device. In some implementations, each cell can be associated with a separate base station. In some implementations, one or more of the cells can share a base station (e.g., a single base station can be associated with multiple cells). As noted above, each is capable of providing the user device with access to a cellular network.

As shown by reference number 102, the first cell transmits first system information data to the user device and the user device receives the first system information data from the first cell. The first system information data can include, for example, master information block (MIB) data, first system information block (SIB1) data, second system information block (SIB2) data, third system information block (SIB3) data, and/or the like, which is periodically broadcast by the first cell in a manner designed to enable the user device (or another user device) to connect to the first cell. In some implementations, the first system information data can include cell metadata that includes one or more cellular parameters, such as an upper layer indicator element (e.g., an upperLayerIndication parameter in the SIB2 data), a public land mobile network (PLMN) information list element (e.g., a PLMN-InfoList parameter in the SIB2 data), a network capability indicator element (e.g., networkCapabilityinfo parameter in the SIB2 data), and/or the like. In some implementations, the upper layer indicator element can be a three-bit string. In some implementations, the upper layer indicator element is associated with a first value that is associated with a cell type of the first cell.

As shown by reference number 104, the user device obtains the cell metadata from the first system information data and identifies the one or more cellular parameters. In some implementations, the user device can parse the cell metadata to identify the one or more cellular parameters. For example, the user device can parse the cell metadata to identify the upper layer indicator element. In some implementations, the user device can obtain the first value that is associated with the upper layer indicator element.

As shown by reference number 106, the user device determines, based on the one or more cellular parameters, that the first cell is of a first cell type or that the first cell has a first capability. For example, based on the upper layer indicator element having a first value of "000," the user device can determine that the first cell is of the first cell type. By way of example, a first value of "000" might be associated with a 5G NR cell type. Based on the association, the user device can determine that the first cell is a 5G NR cell.

As shown by reference number 112, the second cell transmits second system information data to the user device and the user device receives the second system information data from the second cell. As with the first system information data, the second system information data can include information periodically broadcast by the second cell in a manner designed to enable the user device to connect to the second cell, including one or more cellular parameters, such as an upper layer indicator element, a PLMN information list element, a network capability indicator element, and/or the like. In some implementations, the upper layer indicator element can be a three-bit string that is associated with a second value that is associated with a cell type of the second cell.

As shown by reference number 114, the user device obtains and parses the cell metadata from the second system information data to identify the one or more cellular parameters. For example, the user device can obtain and parse the cell metadata to identify the upper layer indicator element. In some implementations, the user device can obtain the second value that is associated with the upper layer indicator element. As shown by reference number 116, the user device determines that the second cell is of a second cell type based on the upper layer indicator element. For example, based on the upper layer indicator element having a second value of "001," the user device can determine that the second cell is of the second cell type. By way of example, a second value of "001" might be associated with a 5G NR sub-6 GHz cell type. Based on the association, the user device can determine that the second cell is a 5G NR sub-6 GHz cell.

As shown by reference number 122, the third cell transmits third system information data to the user device and the user device receives the third system information data from the third cell. As with the first system information data, the third system information data can include information periodically broadcast by the third cell in a manner designed to enable the user device to connect to the third cell, including one or more cellular parameters, such as an upper layer indicator element, a PLMN information list element, a network capability indicator element, and/or the like. In some implementations, the upper layer indicator element can be a three-bit string that is associated with a third value that is associated with a cell type of the third cell.

As shown by reference number 124, the user device obtains and parses the cell metadata from the third system information data to identify the one or more cellular parameters. For example, the user device can obtain and parse the cell metadata to identify the upper layer indicator element. In some implementations, the user device can obtain the third value that is associated with the upper layer indicator element. As shown by reference number 126, the user device determines that the third cell is of a third cell type based on the upper layer indicator element. For example, based on the upper layer indicator element having a third value of "010," the user device can determine that the third cell is of the third cell type. By way of example, a third value of "010" might be associated with a 5G NR mmWave cell type. Based on the association, the user device can determine that the third cell is a 5G NR mmWave cell.

Additionally, or alternatively, in some implementations, the system information data broadcast by a cell may not include the upper layer indicator element. In some implementations, the user device can obtain and parse the cell metadata to determine that the upper layer indicator element does not exist in the system information data. In some implementations, because the upper layer indicator element does not exist, the user device can determine that the cell has not transmitted information concerning the cell type of the cell. In some implementations, the user device can disable taking an action based on the cell type of the cell. For example, the user device can disable the ability to display an indicator that indicates the cell type of the cell on a display of the user device.

In this way, as shown in FIG. 1A, the user device can determine a cell type used by a cell based on cell metadata included in system information data broadcast by the cell. Determining the cell type can enable the user device to take a variety of actions based on the cell type identified. For example, the user device can determine whether to connect to the cell based on the cell type. As another example, the user device can configure a communication component of the user device (e.g., an antenna, a modem, a receiver, a transmitter, a transceiver, a transmit chain, a receive chain, a networking element, and/or the like) based on the cell type of the cell.

In some implementations, as shown in reference numbers 106, 116, and 126, the user device can cause display (e.g., on a display of the user device) of an indicator that indicates that the user device is in communication with a particular cell type. For example, the user device can cause display of a 5G NR indicator, a 5G NR sub-6 GHz indicator, or a 5G NR mmWave indicator to indicate that the user device is in communication with a particular 5G type of cell. A visual indicator can be designed to provide a user of the user device with knowledge of the type of cell to which the user device is connected. The indicator can also provide an indication of the cell type to one or more applications operating on the user device, enabling the application(s) to take action based on the cell type the user device is using to communicate with a network. For example, an application operating on the user device can use information identifying the type of cell to determine whether the user device should connect to the cell (e.g., certain types of cells might be preferred, or disfavored, by a particular user device and/or application).

In some implementations, the user device can cause display (e.g., on a display of the user device) of an icon related to the particular cell type of the cell. For example, the user device can cause display of a 5G NR icon, a 5G NR sub-6 GHz icon, a 5G NR mmWave icon, or another type of icon. In some implementations, the user device can cause display of information that concerns the particular cell type. For example, the user device can cause display of a message and/or alert that indicates that the cell is a 5G NR cell, a 5G NR sub-6 GHz cell, a 5G NR mmWave cell, or another type of cell.

In this way, the user device can use system information data broadcast by a cell to determine a cell type associated with the cell. Based on the cell type, the user device can take a variety of actions designed to improve user experience and/or the functionality of the user device.

Figure 1B:
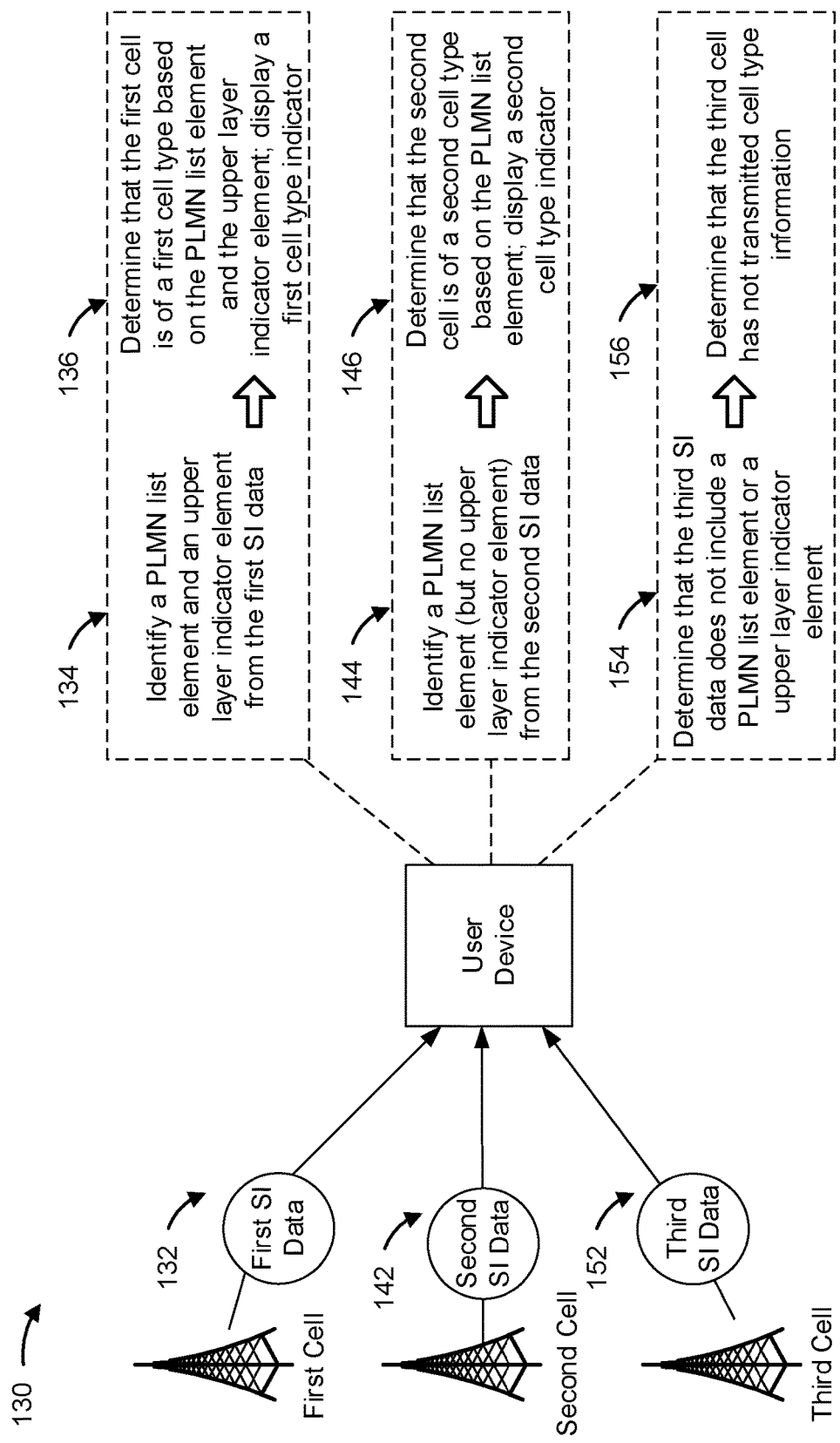

FIG. 1B is a diagram of an example implementation 130 described herein. As shown in FIG. 1B, example implementation 130 includes three cells (e.g., a first cell, a second cell, and a third cell) and the user device (e.g., the same user device depicted in example implementation 100 or a different user device). The cells can be the same or similar to the cells described above, e.g., with reference to example implementation 100 of FIG. 1A.

As shown by reference number 132, the first cell transmits first system information data to the user device and the user device receives the first system information data from the first cell. The first system information data can include, for example, MIB data, SIB1 data, SIB2 data, SIB3 data, and/or the like, which is periodically broadcast by the first cell in a manner designed to enable the user device (or another user device) to connect to the first cell. In some implementations, the first system information data can include cell metadata that includes one or more cellular parameters, such as an upper layer indicator element, a PLMN information list element, a network capability indicator element, and/or the like. In some implementations, the upper layer indicator element can have an enumerated type data type, such as a single-element enumerated type data type. For example, the upper layer indicator element can have a single-element enumerated type data type associated with a "true" value.

As shown by reference number 134, the user device obtains the cell metadata from the first system information data and identifies the one or more cellular parameters. In some implementations, the user device can parse the cell metadata to identify the one or more cellular parameters. For example, the user device can parse the cell metadata to identify the upper layer indicator element and the PLMN information list element.

As shown by reference number 136, the user device determines that the first cell is of a first cell type based on the one or more cellular parameters. For example, based on the existence of the upper layer indicator element and the PLMN information element in the first system information data, the user device can determine that the first cell is of the first cell type. By way of example, the existence of the upper layer indicator and the PLMN information in the first system information data might be associated with a 5G NR mmWave cell type. Based on the association, the user device can determine that the first cell is a 5G NR mmWave cell. In some implementations, other types of parameters, and/or combinations of parameters, included in the same system information data or different system information data, can be used to determine the cell type associated with the first cell (or other cells).

As shown by reference number 142, the second cell transmits second system information data to the user device and the user device receives the second system information data from the second cell. As with the first system information data, the second system information data can include information periodically broadcast by the second cell in a manner designed to enable the user device to connect to the second cell, including one or more cellular parameters. In some implementations, the one or more cellular parameters includes a PLMN information list element and does not include an upper layer indicator element.

As shown by reference number 144, the user device obtains and parses the cell metadata from the second system information data to identify the one or more cellular parameters. For example, the user device can obtain and parse the cell metadata to identify the PLMN information list element. In some implementations, the user device determines that the second system information data does not include the upper layer indicator element. As shown by reference number 146, the user device can determine that the second cell is of a second cell type based on the existence of the PLMN information in the second system information data. By way of example, the existence of the PLMN information in the second system information data might be associated with a 5G NR cell type. Based on the association, the user device can determine that the second cell is a 5G NR cell. In some implementations, other types of parameters, and/or combinations of parameters, included in the same system information data or different system information data, can be used to determine the cell type associated with the second cell (or other cells).

As shown by reference number 152, the third cell transmits third system information data to the user device and the user device receives the third system information data from the third cell. As with the first system information data, the third system information data can include information periodically broadcast by the third cell in a manner designed to enable the user device to connect to the third cell, including one or more cellular parameters. In some implementations, the one or more cellular parameters does not include a PLMN information list element and does not include an upper layer indicator element.

As shown by reference number 154, the user device obtains and parses the cell metadata from the third system information data to identify the one or more cellular parameters. For example, the user device can obtain and parse the cell metadata to determine that the PLMN information list element and the upper layer indicator element do not exist in the third system information data. As shown by reference number 156, the user device can determine that the third cell has not transmitted information concerning the cell type of the third cell based on the PLMN information list element and the upper layer indicator element not being included in the third system information data. In some implementations, based on determining that the third cell has not transmitted information concerning the cell type of the third cell, the user device can disable taking an action based on the cell type of the third cell. For example, the user device can disable the ability to display an indicator that indicates the cell type of the third cell on a display of the user device.

In this way, the user device can determine a cell type used by a cell based on the existence of one or more elements in cell metadata included in system information data broadcast by the cell. As described above, with reference to FIG. 1A, determining the cell type can enable the user device to take a variety of actions based on the cell type identified. The action(s) taken can be designed, for example, to improve the user experience and/or functionality of the user device.

Figure 1C:
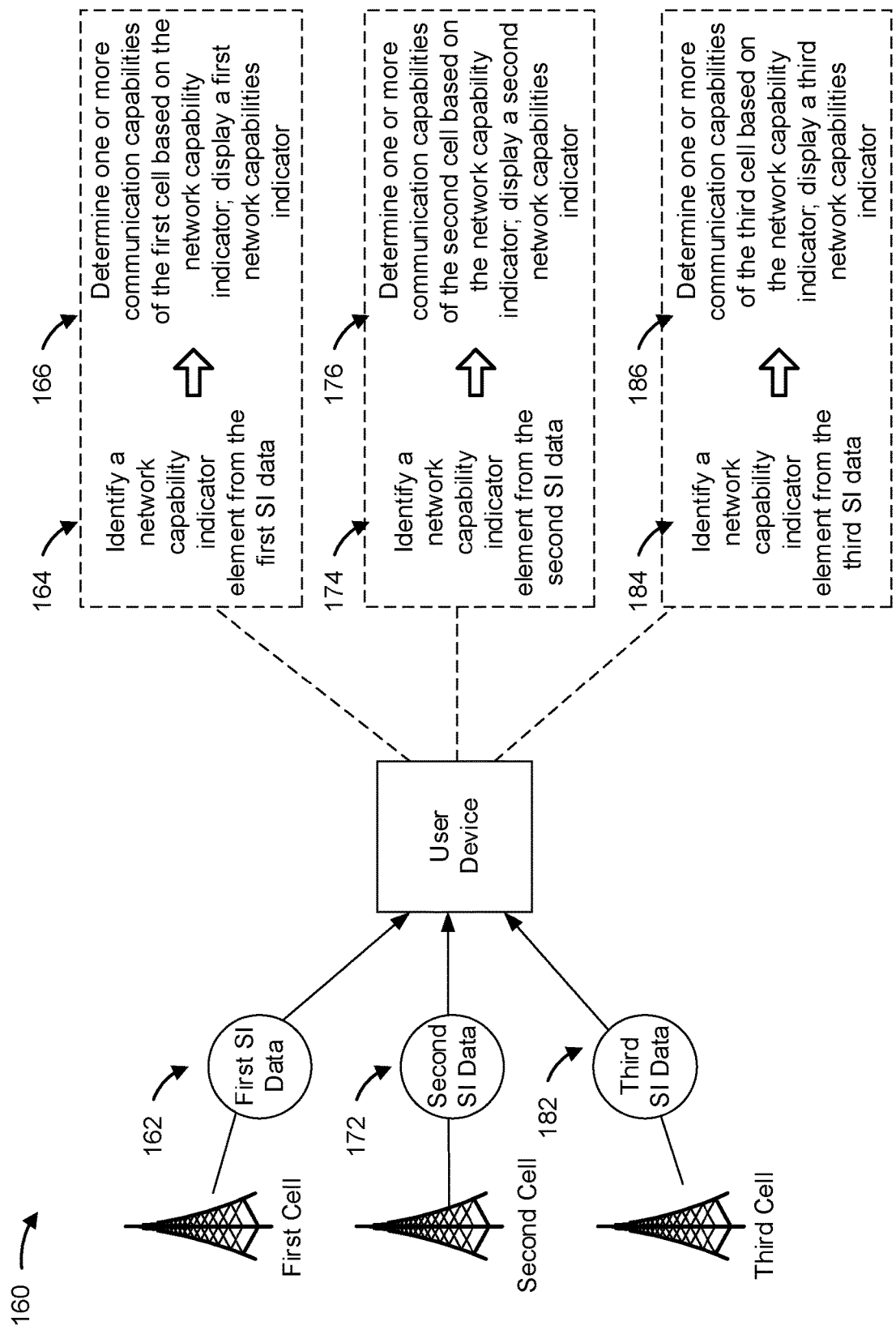

FIG. 1C is a diagram of an example implementation 160 described herein. As shown in FIG. 1C, example implementation 160 includes three cells (e.g., a first cell, second cell, and third cell) and the user device (e.g., the same user device depicted in example implementations 100 or 130, or a different user device). The cells can be the same or similar to the cells described above, e.g., with reference to example implementations 100 or 130 of FIG. 1A or 1B.

As shown by reference number 162, the first cell transmits first system information data to the user device and the user device receives the first system information data from the first cell. The first system information data can include, for example, MIB data, SIB1 data, SIB2 data, SIB3 data, and/or the like, which is periodically broadcast by the first cell in a manner designed to enable the user device (or another user device) to connect to the first cell. In some implementations, the first system information data can include cell metadata that includes one or more cellular parameters, such as an upper layer indicator element, a PLMN information list element, a network capability indicator element, and/or the like. In some implementations, the network capability indicator element can be an eight-bit string. In some implementations, the network capability indicator element is associated with a first value that is associated with one or more communication capabilities of the first cell.

In some implementations, one or more communication capabilities of a cell can include an area capacity communication capability (e.g., a capability to support a data rate capacity over an area), a density communication capability (e.g., a capability to support a number of communications sessions with user devices over an area), a guaranteed minimum data rate communication capability (e.g., a capability to support minimum download and upload speeds), a maximum bitrate communication capability (e.g., a capability to support maximum download and upload bitrates), a relative priority communication capability (e.g., a capability to support a relative importance of an application and/or user device compared to other applications and/or user devices), an absolute priority communication capability (e.g., a capability to support an objective importance of the application and/or user device compared to other applications and/or user devices), a latency rate communication capability (e.g., a capability to support an end-to-end communications transmission time), a reliability communication capability (e.g., a capability to support a communications transmission success rate), and/or the like. In some implementations, the one or more communication capabilities of the cell can include a low latency communication capability (e.g., an end-to-end communications transmission time less than or equal to a threshold, such as 10 ms), a high latency communication capability (e.g., an end-to-end communications transmission time greater than a threshold, such as 10 ms), a low reliability communication capability (e.g., a communications transmission success rate less than or equal to a threshold, such as 99.99%), a high reliability communication capability (e.g., a communications transmission success rate greater than or equal to a threshold, such as 99.99%), a high data rate communication capability (e.g., download and upload speeds above a threshold, such as 50 Mbps), a low data rate communication capability (e.g., download and upload speeds less than or equal to a threshold, such as 50 Mbps), a high traffic density communication capability (e.g., greater than or equal to a threshold number of user devices per geographical area, such as 10,000 user devices per square kilometer), and/or a low traffic density communication capability (e.g., less than a threshold number of user devices per geographical area, such as 10,000 user devices per square kilometer).

In some implementations, the one or more communication capabilities of the cell can define one or more communication capability categories, such as an enhanced mobile broadband category (e.g., for providing enhanced broadband access in dense areas, ultra-high bandwidth access in dense areas, broadband access in public transport systems, and/or the like), a connected vehicles category (e.g., for providing vehicle-to-everything (V2X) communications, such as vehicle-to-vehicle (V2V) communications, vehicle-to-infrastructure (V2I) communications, vehicle-to-network (V2N) communications, vehicle-to-pedestrian (V2P) communications, and/or the like), a real-time service category (e.g., for providing inter-enterprise communications, intra-enterprise communications, maps for navigation, and/or the like), an enhanced multi-media category (e.g., for providing broadcast services, on demand and live TV, mobile TV, augmented reality (AR), virtual reality (VR), and/or the like), an internet of things category (e.g., for providing metering, lighting management in buildings and cities, environmental monitoring, traffic control, and/or the like), an ultra-reliable low latency applications category (e.g., for providing process automation, automated factories, tactile interaction, emergency communications, urgent healthcare, and/or the like), a fixed wireless access category (e.g., for providing localized network access and/or the like), and/or the like.

As shown by reference number 164, the user device obtains the cell metadata from the first system information data and identifies the one or more cellular parameters. In some implementations, the user device can parse the cell metadata to identify the one or more cellular parameters. For example, the user device can parse the cell metadata to identify the network capability indicator element. In some implementations, the user device can obtain the first value that is associated with the network capability indicator element.

As shown by reference number 166, the user device determines the one or more communication capabilities of the first cell based on the network capability indicator element. For example, based on the upper layer indicator having a first value of "10000000," the user device can determine that the first cell has a low latency communication capability. By way of example, a first value of "10000000" might be associated with an end-to-end communications transmission time less than or equal to a threshold, such as 15 ms. Based on the association, the user device can determine that the first cell has a low latency communication capability.

As shown by reference number 172, the second cell transmits second system information data to the user device and the user device receives the second system information data from the second cell. As with the first system information data, the second system information data can include information periodically broadcast by the second cell in a manner designed to enable the user device to connect to the second cell, including one or more cellular parameters, such as an upper layer indicator element, a PLMN information list element, a network capability indicator element, and/or the like. In some implementations, the network capability indicator element can be an eight-bit string that is associated with a second value that is associated with one or more communication capabilities of the second cell.

As shown by reference number 174, the user device obtains and parses the cell metadata from the second system information data to identify the one or more cellular parameters. For example, the user device can obtain and parse the cell metadata to identify the network capability indicator element. In some implementations, the user device can obtain the second value that is associated with the network capability indicator element. As shown by reference number 176, the user device can determine the one or more communication capabilities of the second cell based on the network capability indicator element. For example, based on the network capability indicator element having a second value of "01000000," the user device can determine that the second cell has a high reliability communication capability. By way of example, a second value of "01000000" might be associated with a communications transmission success rate greater than or equal to a threshold, such as 90%. Based on the association, the user device can determine that the second cell has a high reliability communication capability.

As shown by reference number 182, the third cell transmits third system information data to the user device and the user device receives the third system information data from the third cell. As with the first system information data, the third system information data can include information periodically broadcast by the third cell in a manner designed to enable the user device to connect to the third cell, including one or more cellular parameters, such as an upper layer indicator element, a PLMN information list element, a network capability indicator element, and/or the like. In some implementations, the network capability indicator element can be an eight-bit string that is associated with a third value that is associated with one or more communication capabilities of the third cell.

As shown by reference number 184, the user device obtains and parses the cell metadata from the third system information data to identify the one or more cellular parameters. For example, the user device can obtain and parse the cell metadata to identify the network capability indicator element. In some implementations, the user device obtains the third value that is associated with the network capability indicator element. As shown by reference number 186, the user device can determine the one or more communication capabilities of the third cell based on the network capability indicator element. For example, based on the network capability indicator element having a third value of "00101000," the user device can determine that the third cell has a low data rate communication capability and a high traffic density communication capability. By way of example, a third value of "00101000" might be associated with the cell supporting download and upload speeds less than or equal to a threshold, such as 65 Mbps, and supporting a number of user devices greater than or equal to a threshold per geographical area, such as 3,000 user devices per square kilometer. Based on the association, the user device can determine that the third cell has a low data rate communication capability and a high traffic density communication capability.

In this way, as shown in FIG. 1C, the user device can determine one or more communication capabilities of a cell based on cell metadata included in system information data broadcast by the cell. Determining the one or more communication capabilities of the cell can enable the user device to take a variety of actions based on the one or more communication capabilities of the cell. For example, the user device can determine whether to connect to the cell based on the one or more communication capabilities of the cell. As another example, the user device can configure a communication component of the user device (e.g., an antenna, a modem, a receiver, a transmitter, a transceiver, a transmit chain, a receive chain, a networking element, and/or the like) based on the one or more communication capabilities of the cell.

In some implementations, as shown in reference numbers 166, 176, and 186, the user device can cause display (e.g., on a display of the user device) of an indicator that indicates the one or more communication capabilities of the cell. For example, the user device can cause display of a low latency indicator, a high latency indicator, a low reliability indicator, a high reliability indicator, a low data rate indicator, a high data rate indicator, a low traffic density indicator, a high traffic density indicator, an enhanced mobile broadband indicator, a connected vehicles indicator, a real-time service indicator, an enhanced multi-media indicator, an internet of things indicator, an ultra-reliable low latency applications indicator, a fixed wireless access indicator, and/or another type of indicator. A visual indicator can be designed to provide a user of the user device with knowledge of the one or more communication capabilities of the cell to which the user device is connected. The indicator can also provide an indication of the one or more communication capabilities of the cell to one or more applications operating on the user device, enabling the application(s) to take action based on the one or more communication capabilities of the cell the user device is using to communicate with a network. For example, an application operating on the user device can use information identifying the one or more communication capabilities of the cell to determine whether the user device should connect to the cell (e.g., certain types of communication capabilities might be preferred, or disfavored, by a particular user device and/or application).

In some implementations, the user device can cause display (e.g., on a display of the user device) of an icon related to the one or more communication capabilities of the cell. For example, the user device can cause display of a low latency icon, a high latency icon, a low reliability icon, a high reliability icon, a low data rate icon, a high data rate icon, a low traffic density icon, a high traffic density icon, an enhanced mobile broadband icon, a connected vehicles icon, a real-time service icon, an enhanced multi-media icon, an internet of things icon, an ultra-reliable low latency applications icon, a fixed wireless access icon, and/or another type of icon. In some implementations, the user device can cause display information that concerns the one or more communication capabilities of the cell. For example, the user device can cause display of a message and/or alert that indicates the one or more communication capabilities of the cell.

In this way, the user device can use system information data broadcast by a cell to determine the one or more communication capabilities of the cell. Based on the one or more communication capabilities of the cell, the user device can take a variety of actions designed to improve user experience and/or the functionality of the user device.

While examples above describe some implementations determining a cell type from among three types of cellular technology, in some implementations, more (or fewer) types of cellular technology can be determined from cellular data broadcast by a cell. In some implementations, other information can also be used to determine the cell type, including data identifying the type of radio through which the user device receives cellular data. For example, cellular data can be received via a 3G radio, LTE radio, a Wi-Fi radio, and/or the like, and the source of the cellular data can be used to determine a subset of cellular technology from which the user device can determine a cell type associated with the cell that provided the cellular data.

In this way, a user device can determine a cell type (e.g., a specific communications technology) used by a cell and/or one or more capabilities of the cell from information regularly broadcast by the cell (e.g., system information broadcast data), facilitating a variety of actions being taken by the user device. By determining the cell type and/or the one or more capabilities of the cell from system information data, the user device can perform a variety of actions without requiring additional information to be provided by the cell, including connecting to the cell based on the cell type and/or the one or more capabilities of the cell (e.g., prioritizing one type of cell over another), displaying a cell type indicator and/or a cell capabilities indicator (e.g., providing a user of the user device with information indicating which type of cell the user device is in communication with and/or the one or more capabilities of the cell), and/or the like. Several different stages of the process for determining the cell type and/or the one or more capabilities of the cell from cellular broadcast data are automated, which can improve speed and efficiency of the process and conserve computing resources (e.g., processor resources, memory resources, and/or the like). Furthermore, implementations described herein use a rigorous, computerized process to perform tasks or roles that were not previously performed. Finally, automating the process for determining the cell type and/or the one or more capabilities of the cell from cellular broadcast data conserves computing resources (e.g., processor resources, memory resources, and/or the like) that would otherwise be wasted by using multiple different types of communications data and/or devices with different software, protocols, and configurations.

As indicated above, FIGS. 1A-1C are provided merely as examples. Other examples are possible and can differ from what was described with regard to FIGS. 1A-1C.

Figure 2:
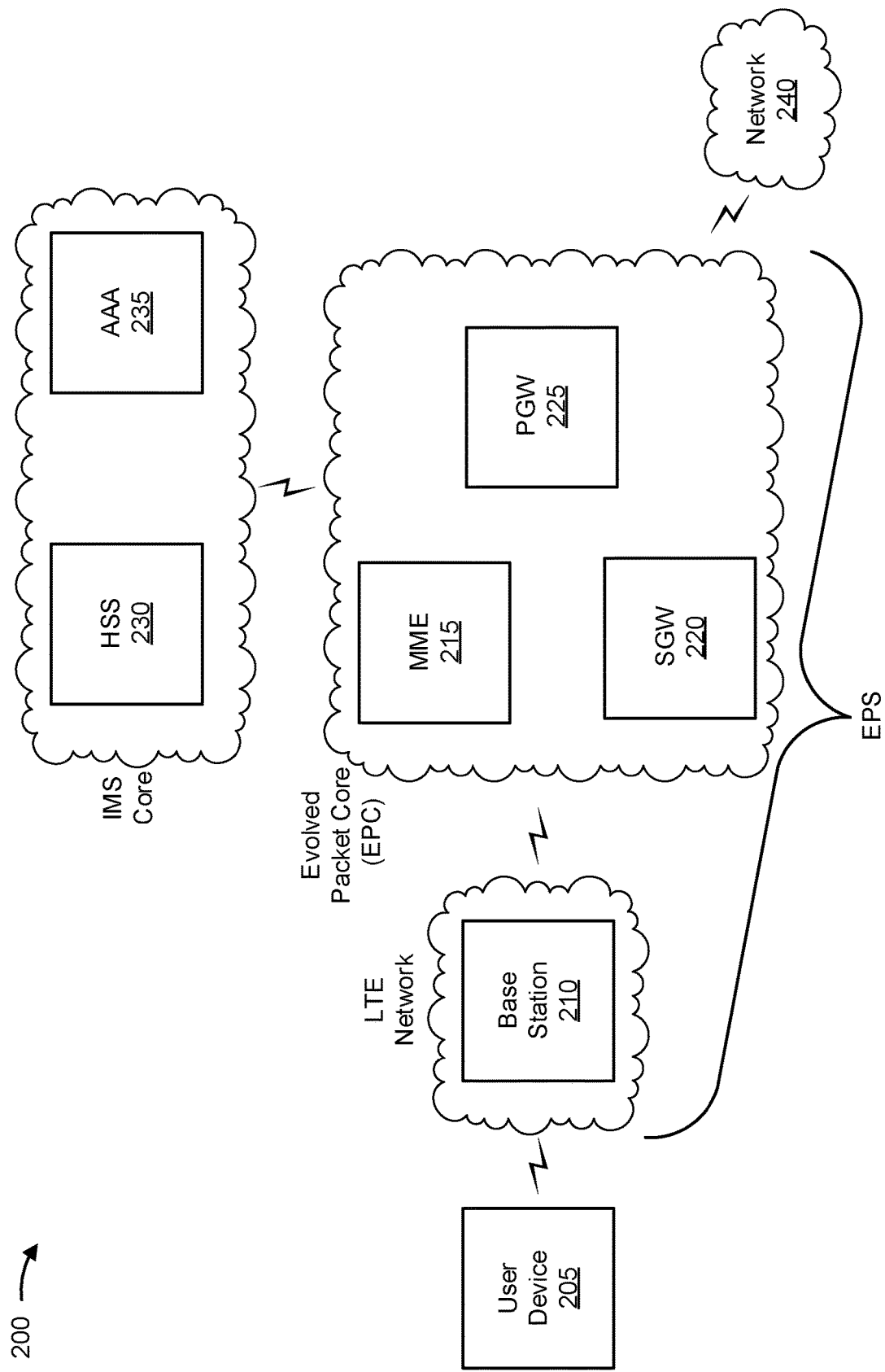
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; and a network 240. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a 3G network or a 5G network. With a 5G network, one or more of the devices and/or functions described herein may be virtualized and performed within a cloud computing environment and/or by one or more devices different than those described herein.

Environment 200 can include an evolved packet system (EPS) that includes an LTE network and/or an evolved packet core (EPC) that operate based on a third generation partnership project (3 GPP) wireless communication standard. The LTE network can include a radio access network (RAN) that includes one or more base stations 210 (e.g. cells) that take the form of evolved Node Bs (eNBs) via which user device 205 communicates with the EPC. The EPC can include MME 215, SGW 220, and/or PGW 225 that enable user device 205 to communicate with network 240 and/or an Internet protocol (IP) multimedia subsystem (IMS) core. The IMS core can include HSS 230 and/or AAA 235, and can manage device registration and authentication, session initiation, etc., associated with user devices 205. HSS 230 and/or AAA 235 can reside in the EPC and/or the IMS core.

User device 205 can include one or more devices capable of communicating with base station 210 and/or a network (e.g., network 240). For example, user device 205 can include a wireless communication device, a radiotelephone, a personal communications system (PCS) terminal (e.g., that can combine a cellular radiotelephone with data processing and data communications capabilities), a smart phone, a wearable computing device, a laptop computer, a tablet computer, a personal gaming system, and/or a similar device. User device 205 can send traffic to and/or receive traffic from network 240 (e.g., via base station 210, SGW 220, and/or PGW 225). In some implementations, user device 205 can receive system information data from a particular cell associated with a base station 210, can obtain cell metadata from the system information, can identify (e.g., based on parsing the cell metadata) cellular parameters, and, based on the cellular parameters, can determine that the particular cell is of a particular cell type and/or has a particular capability. In some implementations, user device 205 can cause display (e.g., on a display of user device 205) of an indicator that indicates that the user device is in communication with a particular cell type and/or that the cell has one or more communication capabilities.

Base station 210 (e.g., also referred to as a cell, or cell site) can include one or more devices capable of transferring traffic, such as audio, video, text, and/or other traffic, destined for and/or received from user device 205. In some implementations, base station 210 can include an eNB associated with the LTE network that receives traffic from and/or sends traffic to network 240 via SGW 220 and/or PGW 225. Additionally, or alternatively, one or more base stations 210 can be associated with a RAN that is not associated with the LTE network. Base station 210 can send traffic to and/or receive traffic from user device 205 via an air interface. In some implementations, base station 210 can include a small cell base station, such as a base station of a microcell, a picocell, and/or a femtocell. In some implementations, base station 210 can transmit system information data to user device 205, from which user device 205 can obtain cell metadata, identify cellular parameters, and determine that a cell associated with base station 210 is of a particular cell type and/or has a particular capability. In some implementations, base station 210 can be associated with a 4G LTE cell, a 5G NR cell, a 5G NR sub-6 GHz cell, a 5G NR mmWave cell, or the like.

MME 215 can include one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 can include one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 240 (e.g., via PGW 225) and/or other network devices associated with the EPC and/or the IMS core. SGW 220 can also receive traffic from network 240 and/or other network devices, and can send the received traffic to user device 205 via base station 210. Additionally, or alternatively, SGW 220 can perform operations associated with handing off user device 205 to and/or from an LTE network.

PGW 225 can include one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 240. Additionally, or alternatively, PGW 225 can receive traffic from network 240, and can send the traffic to user device 205 via SGW 220 and base station 210. PGW 225 can record data usage information (e.g., byte usage), and can provide the data usage information to AAA 235.

HSS 230 can include one or more devices, such as one or more server devices, capable of managing (e.g., receiving, generating, storing, processing, and/or providing) information associated with user device 205. For example, HSS 230 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 can include one or more devices, such as one or more server devices, that perform authentication, authorization, and/or accounting operations for communication sessions associated with user device 205. For example, AAA 235 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

Network 240 can include one or more wired and/or wireless networks. For example, network 240 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
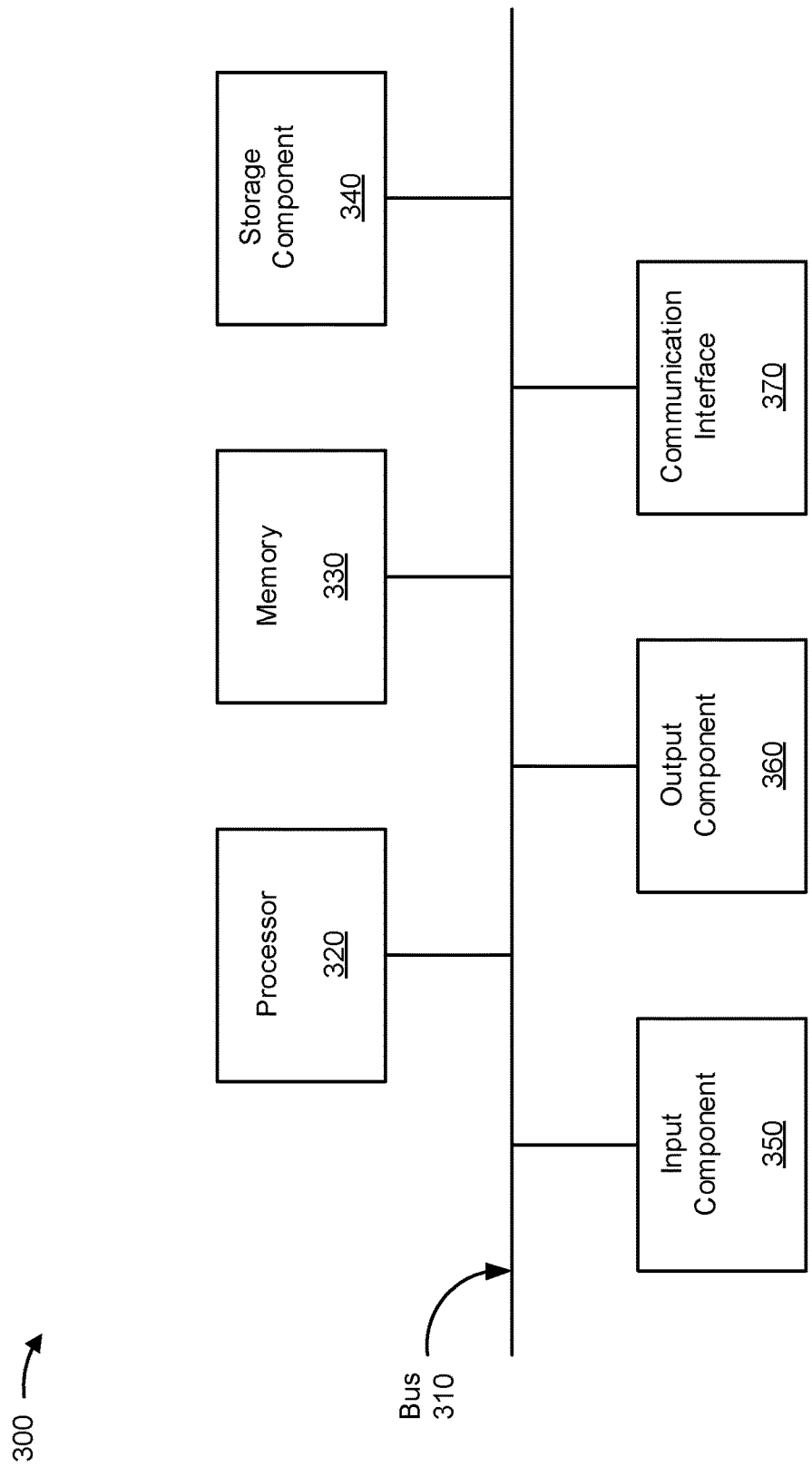
FIG. 3 is a diagram of example components of one or more devices of FIG. 2.

FIG. 3 is a diagram of example components of a device 300. Device 300 can correspond to user device 205, a base station 210, an MME 215, a SGW 220, a PGW 225, an HSS 230, and/or an AAA 235. In some implementations, user device 205, a base station 210, an MME 215, a SGW 220, a PGW 225, an HSS 230, and/or an AAA 235 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
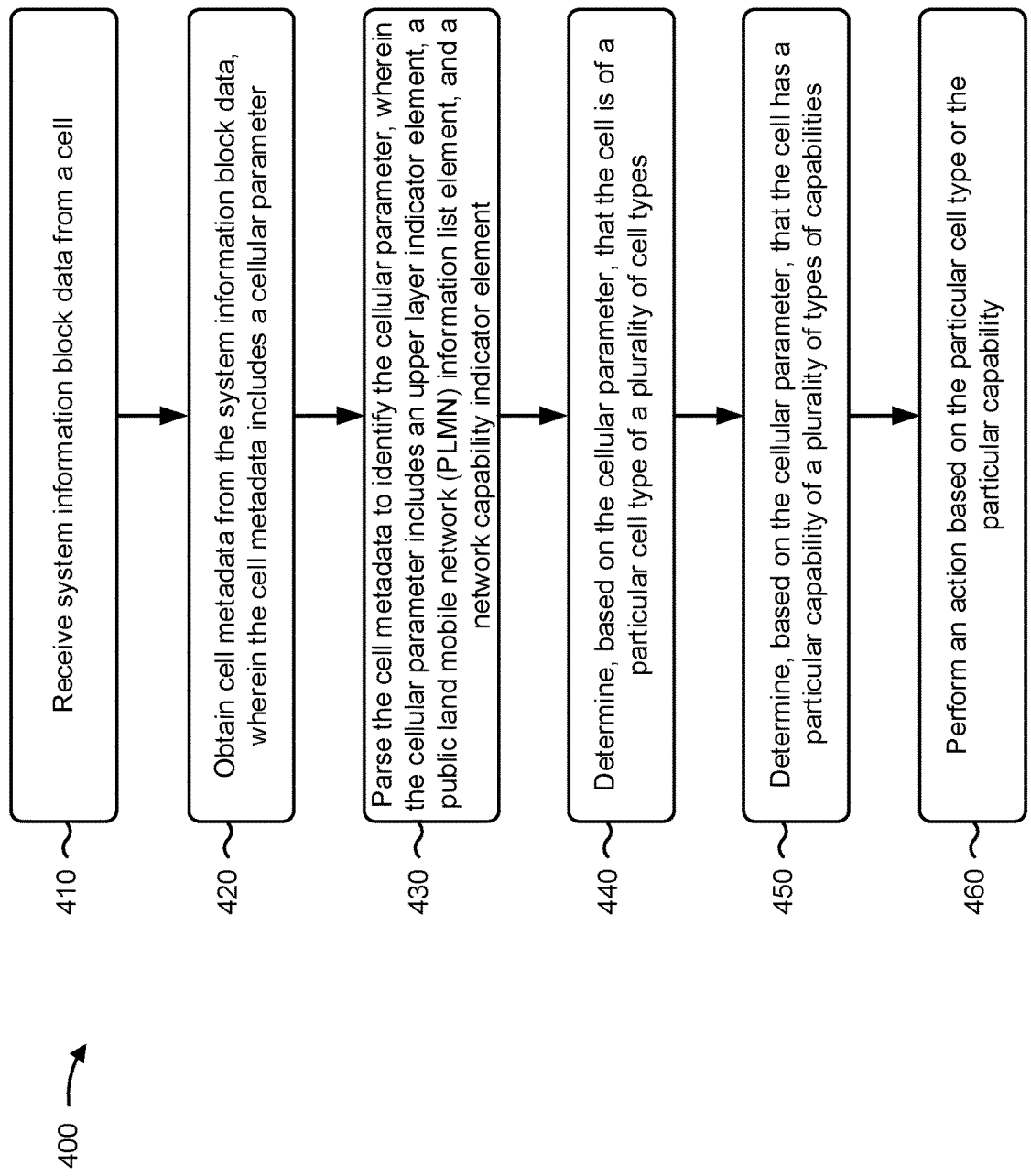
FIG. 4 is a flow chart of an example process for identifying a cell type and/or cell communication capabilities from cellular broadcast data.

FIG. 4 is a flow chart of an example process 400 for identifying communications technology from cellular broadcast data. In some implementations, one or more process blocks of FIG. 4 can be performed by a user device (e.g., user device 205). In some implementations, one or more process blocks of FIG. 4 can be performed by another device or a group of devices separate from or including the user device, such as a base station 210, an MME 215, a SGW 220, a PGW 225, an HSS 230, and/or an AAA 235.

As shown in FIG. 4, process 400 can include receiving system information block data from a cell (block 410). For example, the user device (e.g., using processor 320, memory 330, storage component 340, input component 350, communication interface 370, and/or the like) can receive system information block data from a cell, as described above in connection with FIGS. 1A-1C.

As further shown in FIG. 4, process 400 can include obtaining cell metadata from the system information block data, wherein the cell metadata includes a cellular parameter (block 420). For example, the user device (e.g., using processor 320, memory 330, storage component 340, input component 350, communication interface 370, and/or the like) can obtain cell metadata from the system information block data, as described above in connection with FIGS. 1A-1C. In some implementations, the cell metadata can include a cellular parameter.

As further shown in FIG. 4, process 400 can include parsing the cell metadata to identify the cellular parameter, wherein the cellular parameter includes an upper layer indicator element, a public land mobile network (PLMN) information list element, or a network capability indicator element (block 430). For example, the user device (e.g., using processor 320, memory 330, storage component 340, and/or the like) can parse the cell metadata to identify the cellular parameter, as described above in connection with FIGS. 1A-1C. In some implementations, the cellular parameter can include an upper layer indicator element, a public land mobile network (PLMN) information list element, or a network capability indicator element.

As further shown in FIG. 4, process 400 can include determining, based on the cellular parameter, that the cell is of a particular cell type of a plurality of cell types (block 440). For example, the user device (e.g., using processor 320, memory 330, storage component 340, and/or the like) can determine, based on the cellular parameter, that the cell is of a particular cell type of a plurality of cell types, as described above in connection with FIGS. 1A-1C.

As further shown in FIG. 4, process 400 can include determining, based on the cellular parameter, that the cell has a particular capability of a plurality of types of capabilities (block 450). For example, the user device (e.g., using processor 320, memory 330, storage component 340, and/or the like) can determine, based on the cellular parameter, that the cell has a particular capability of a plurality of types of capabilities, as described above in connection with FIGS. 1A-1C.

As further shown in FIG. 4, process 400 can include performing an action based on the particular cell type and the particular capability (block 460). For example, the user device (e.g., using processor 320, memory 330, storage component 340, input component 350, output component 360, communication interface 370, and/or the like) can perform an action based on the particular cell type and the particular capability, as described above in connection with FIGS. 1A-1C.

Process 400 can include additional implementations, such as any single implementation or any combination of implementations described below and/or described with regard to any other process described herein.

In some implementations, the upper layer indicator element can be a three-bit string. In some implementations, the upper layer indicator element can be associated with a value, and the user device, when determining, based on the cellular parameter, that the cell is of the particular cell type of the plurality of cell types, or that the cell has a particular capability of a plurality of types of capabilities, can determine that the value associated with the upper layer indicator element is associated with the particular cell type.

In some implementations, when performing the action based on the particular cell type and the particular capability, the user device can cause display of an indicator on a display of the user device. In some implementations, the indicator can indicate that the user device is in communication with the particular cell type.

In some implementations, when performing the action based on the particular cell type and the particular capability, the user device can cause display of information on a display of the user device. In some implementations, the information can concern the particular cell capability.

In some implementations, when performing the action based on the particular cell type and the particular capability, the user device can cause display of one or more icons related to the particular cell type and the particular cell capability. In some implementations, when performing the action based on the particular cell type and the particular capability, the user device can determine whether to connect to the cell.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
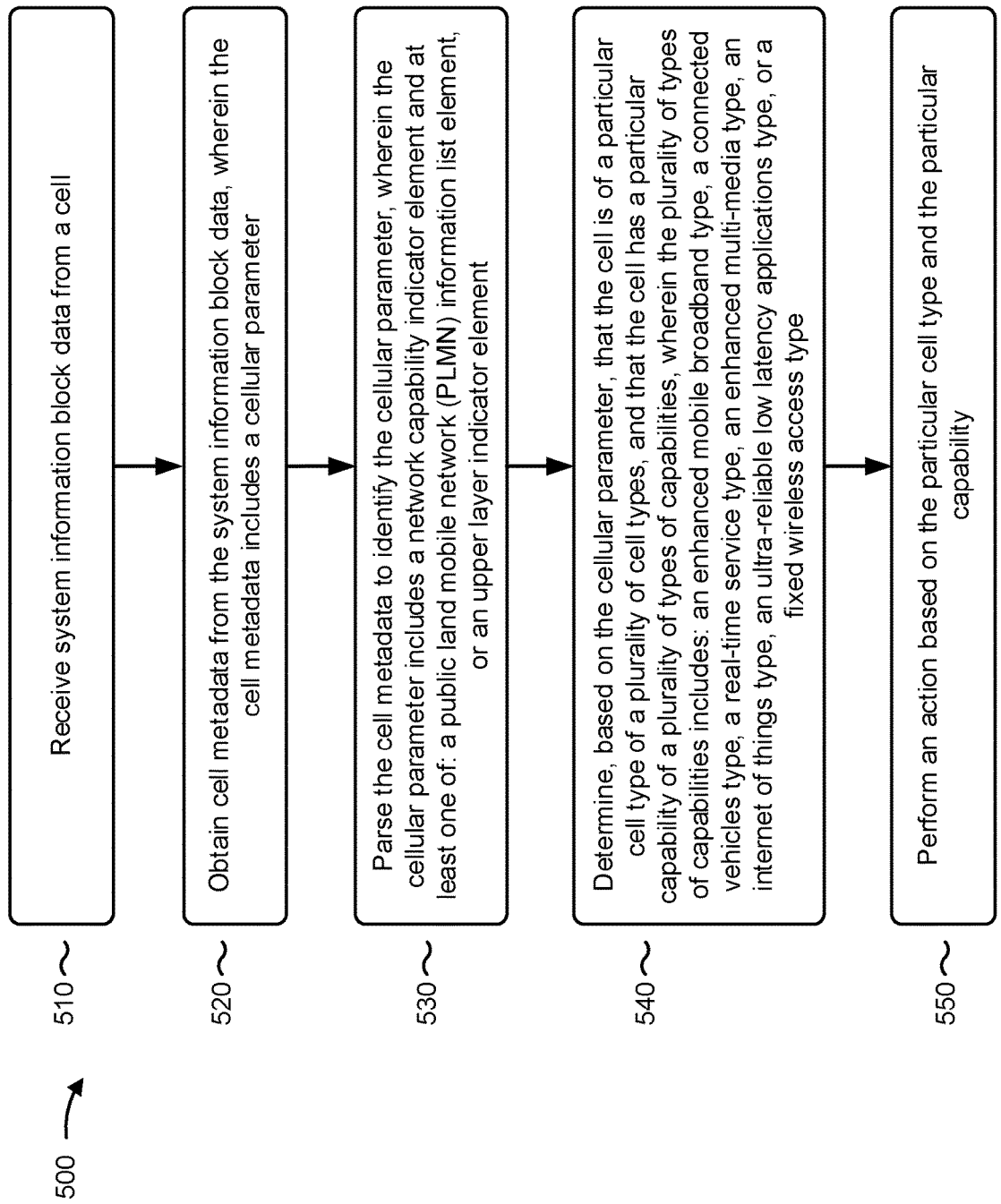
FIG. 5 is a flow chart of an example process for identifying a cell type and/or cell communication capabilities from cellular broadcast data.

FIG. 5 is a flow chart of an example process 500 for identifying communications technology from cellular broadcast data. In some implementations, one or more process blocks of FIG. 5 can be performed by a user device (e.g., user device 205). In some implementations, one or more process blocks of FIG. 5 can be performed by another device or a group of devices separate from or including the user device, such as a base station 210, an MME 215, a SGW 220, a PGW 225, an HSS 230, and/or an AAA 235.

As shown in FIG. 5, process 500 can include receiving system information block data from a cell (block 510). For example, the user device (e.g., using processor 320, memory 330, storage component 340, input component 350, communication interface 370, and/or the like) can receive system information block data from a cell, as described above in connection with FIGS. 1A-1C.

As further shown in FIG. 5, process 500 can include obtaining cell metadata from the system information block data, wherein the cell metadata includes a cellular parameter (block 520). For example, the user device (e.g., using processor 320, memory 330, storage component 340, input component 350, communication interface 370, and/or the like) can obtain cell metadata from the system information block data, as described above in connection with FIGS. 1A-1C. In some implementations, the cell metadata can include a cellular parameter.

As further shown in FIG. 5, process 500 can include parsing the cell metadata to identify the cellular parameter, wherein the cellular parameter includes a network capability indicator element and at least one of a public land mobile network (PLMN) information list element, or an upper layer indicator element (block 530). For example, the user device (e.g., using processor 320, memory 330, storage component 340, and/or the like) can parse the cell metadata to identify the cellular parameter, as described above in connection with FIGS. 1A-1C. In some implementations, the cellular parameter can include a network capability indicator element and at least one of a public land mobile network (PLMN) information list element, or an upper layer indicator element.

As further shown in FIG. 5, process 500 can include determining, based on the cellular parameter, that the cell is of a particular cell type of a plurality of cell types, and that the cell has a particular capability of a plurality of types of capabilities, wherein the plurality of types of capabilities includes: an enhanced mobile broadband type, a connected vehicles type, a real-time service type, an enhanced multi-media type, an internet of things type, an ultra-reliable low latency applications type, or a fixed wireless access type (block 540). For example, the user device (e.g., using processor 320, memory 330, storage component 340, and/or the like) can determine, based on the cellular parameter, that the cell is of a particular cell type of a plurality of cell types, or that the cell has a particular capability of a plurality of types of capabilities, as described above in connection with FIGS. 1A-1C. In some implementations, the plurality of types of capabilities includes: an enhanced mobile broadband type, a connected vehicles type, a real-time service type, an enhanced multi-media type, an internet of things type, an ultra-reliable low latency applications type, or a fixed wireless access type.

As further shown in FIG. 5, process 500 can include performing an action based on the particular cell type and the particular capability (block 550). For example, the user device (e.g., using processor 320, memory 330, storage component 340, input component 350, output component 360, communication interface 370, and/or the like) can perform an action based on the particular cell type and the particular capability, as described above in connection with FIGS. 1A-1C.

Process 500 can include additional implementations, such as any single implementation or any combination of implementations described below and/or described with regard to any other process described herein.

In some implementations, the upper layer indicator element can have an enumerated type data type. In some implementations, the upper layer indicator element can have a single-element enumerated type data type.

In some implementations, when determining that the cell is of the particular cell type of the plurality of cell types, and that the cell has the particular capability of the plurality of types of capabilities, the user device can determine that the cellular parameter includes the PLMN information list element and that the cellular parameter does not include the upper layer indicator element.

In some implementations, when determining that the cell is of the particular cell type of the plurality of cell types, and that the cell has the particular capability of the plurality of types of capabilities, the user device can determine that the cellular parameter includes the PLMN information list element and the upper layer indicator element.

In some implementations, when performing the action based on the particular cell type or the particular capability, the user device can cause display of a first indicator on a display of the user device and can cause display of a second indicator on the display of the user device. In some implementations, the first indicator can indicate the particular cell type. In some implementations, the second indicator can indicate the particular capability.

In some implementations, when performing the action based on the particular cell type and the particular capability, the user device can configure a communication component of the user device based on the particular cell type and the particular capability.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Figure 6:
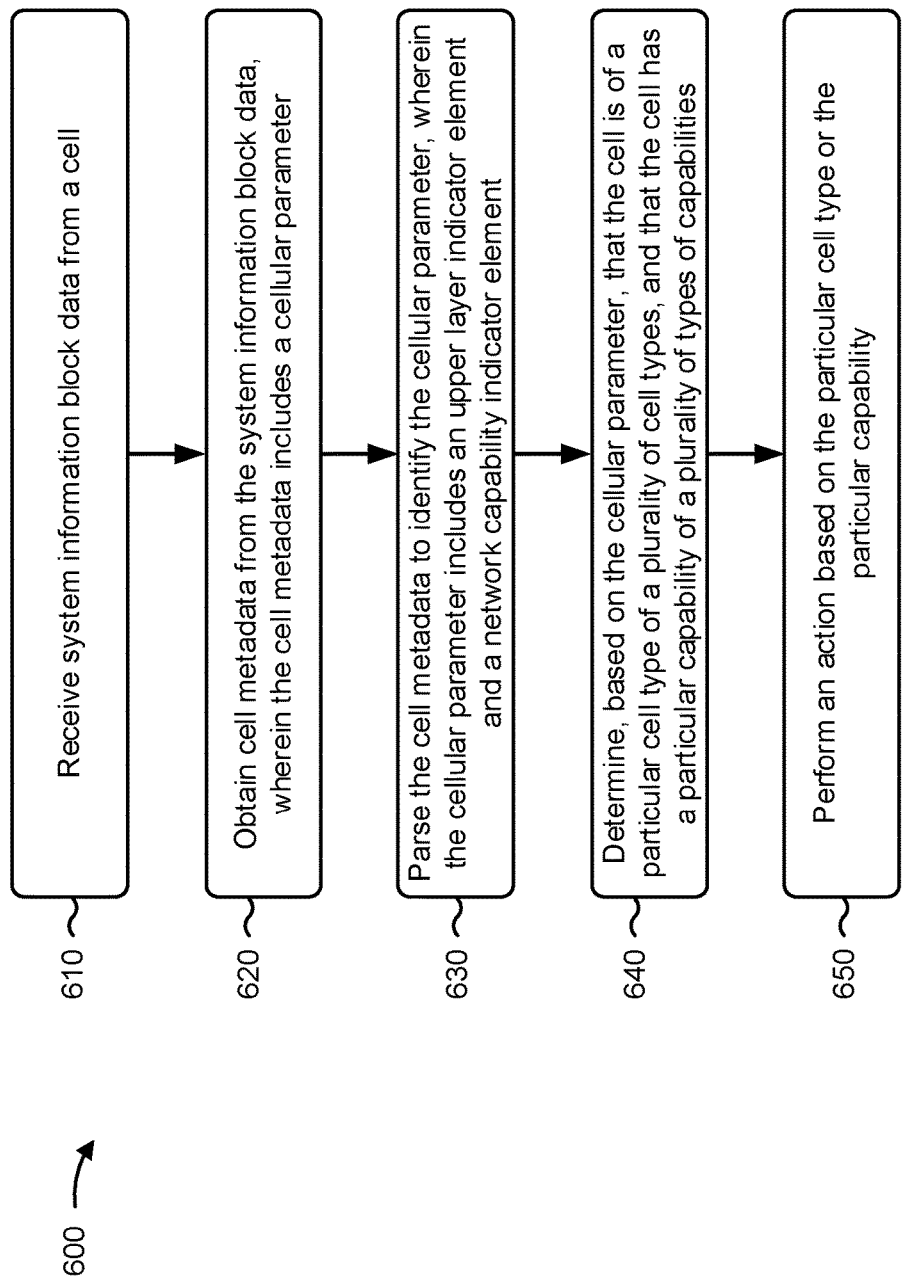
FIG. 6 is a flow chart of an example process for identifying a cell type and/or cell communication capabilities from cellular broadcast data.

FIG. 6 is a flow chart of an example process 600 for identifying communications technology from cellular broadcast data. In some implementations, one or more process blocks of FIG. 6 can be performed by a user device (e.g., user device 205). In some implementations, one or more process blocks of FIG. 6 can be performed by another device or a group of devices separate from or including the user device, such as a base station 210, an MME 215, a SGW 220, a PGW 225, an HSS 230, and/or an AAA 235.

As shown in FIG. 6, process 600 can include receiving system information block data from a cell (block 610). For example, the user device (e.g., using processor 320, memory 330, storage component 340, input component 350, communication interface 370, and/or the like) can receive system information block data from a cell, as described above in connection with FIGS. 1A-1C.

As further shown in FIG. 6, process 600 can include obtaining cell metadata from the system information block data, wherein the cell metadata includes a cellular parameter (block 620). For example, the user device (e.g., using processor 320, memory 330, storage component 340, input component 350, communication interface 370, and/or the like) can obtain cell metadata from the system information block data, as described above in connection with FIGS. 1A-1C. In some implementations, the cell metadata can include a cellular parameter.

As further shown in FIG. 6, process 600 can include parsing the cell metadata to identify the cellular parameter, wherein the cellular parameter includes an upper layer indicator element and a network capability indicator element (block 630). For example, the user device (e.g., using processor 320, memory 330, storage component 340, and/or the like) can parse the cell metadata to identify the cellular parameter, as described above in connection with FIGS. 1A-1C. In some implementations, the cellular parameter can include an upper layer indicator element and a network capability indicator element.

As further shown in FIG. 6, process 600 can include determining, based on the cellular parameter, that the cell is of a particular cell type of a plurality of cell types, and that the cell has a particular capability of a plurality of types of capabilities (block 640). For example, the user device (e.g., using processor 320, memory 330, storage component 340, and/or the like) can determine, based on the cellular parameter, that the cell is of a particular cell type of a plurality of cell types, and that the cell has a particular capability of a plurality of types of capabilities, as described above in connection with FIGS. 1A-1C.

As further shown in FIG. 6, process 600 can include performing an action based on the particular cell type or the particular capability (block 650). For example, the user device (e.g., using processor 320, memory 330, storage component 340, input component 350, output component 360, communication interface 370, and/or the like) can perform an action based on the particular cell type or the particular capability, as described above in connection with FIGS. 1A-1C.

Process 600 can include additional implementations, such as any single implementation or any combination of implementations described below and/or described with regard to any other process described herein.

In some implementations, the plurality of types of capabilities can concern at least one of an area capacity communication capability, a density communication capability, a guaranteed minimum data rate communication capability, a maximum bitrate communication capability, a relative priority communication capability, an absolute priority communication capability, a latency rate communication capability, or a reliability communication capability. In some implementations, the network capability indicator element can be associated with a value, and the user device can determine that the value associated with the network capability indicator element is associated with the particular capability.

In some implementations, when performing the action based on the particular cell type or the particular capability, the user device can cause display of an indicator on a display of a user device associated with the one or more processors. In some implementations, the indicator can indicate the particular capability.

In some implementations, when performing the action based on the particular cell type or the particular capability, the user device can configure a communication component of a user device associated with the one or more processors based on the particular capability. In some implementations, when performing the action based on the particular cell type or the particular capability, the user device can determine whether to connect to the cell based on the particular capability.

Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

Some implementations, described herein, provide a user device 205 that is capable of using system information (e.g., included in a system information block (SIB)) broadcast by a base station 210 (e.g., a cellular base station, or a cell) to distinguish between different types of communications technology (e.g., cell types) used by the base station 210 and/or to distinguish between different communication capabilities of the base station 210. For example, the user device 205 can receive system information (e.g., master information block (MIB) data, a first system information block (SIB1) data, a second system information block (SIB2) data, a third system information block (SIB3) data, and/or the like) from the base station 210. In some implementations, the system information can include cell metadata (e.g., information capable of being used by the user device 205 for a variety of purposes) that includes one or more cellular parameters, such as an upper layer indicator element, a PLMN information list element, a network capability indicator element, and/or the like. The user device 205 can obtain the cell metadata and identify the one or more cellular parameters.

In this way, a user device 205 can determine a cell type (e.g., a specific communications technology) used by a cell and/or one or more capabilities of the cell from information regularly broadcast by the cell (e.g., system information broadcast data), facilitating a variety of actions being taken by the user device. By determining the cell type and/or the one or more capabilities of the cell from system information data, the user device 205 can perform a variety of actions without requiring additional information to be provided by the cell, including connecting to the cell based on the cell type and/or the one or more capabilities of the cell (e.g., prioritizing one type of cell over another), displaying a cell type indicator and/or a cell capabilities indicator (e.g., providing a user of the user device with information indicating which type of cell the user device is in communication with and/or the one or more capabilities of the cell), and/or the like. Several different stages of the process for determining the cell type and/or the one or more capabilities of the cell from cellular broadcast data are automated, which can improve speed and efficiency of the process and conserve computing resources (e.g., processor resources, memory resources, and/or the like). Furthermore, implementations described herein use a rigorous, computerized process to perform tasks or roles that were not previously performed. Finally, automating the process for determining the cell type and/or the one or more capabilities of the cell from cellular broadcast data conserves computing resources (e.g., processor resources, memory resources, and/or the like) that would otherwise be wasted by using multiple different types of communications data and/or devices with different software, protocols, and configurations.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below might directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device comprising:
one or more memories; and
one or more processors, communicatively coupled to the one or more memories, to:
receive system information block data from a cell;
obtain cell metadata from the system information block data,
wherein the cell metadata includes a cellular parameter;
parse the cell metadata to identify the cellular parameter,
wherein the cellular parameter includes an upper layer indicator element, a public land mobile network (PLMN) information list element, and a network capability indicator element;
determine, based on the cellular parameter, that the cell is of a particular cell type of a plurality of cell types;
determine, based on the cellular parameter, that the cell has a particular capability of a plurality of types of capabilities; and
perform an action based on the particular cell type and the particular capability.

2. The user device of claim 1, wherein the upper layer indicator element is a three-bit string.

3. The user device of claim 2, wherein:
the upper layer indicator element is associated with a value; and
the one or more processors, when determining, based on the cellular parameter, that the cell is of the particular cell type of the plurality of cell types, are to:

determine that the value associated with the upper layer indicator element is associated with the particular cell type.

4. The user device of claim 1, wherein the one or more processors, when performing the action based on the particular cell type and the particular capability, are to:
cause display of an indicator on a display of the user device,
wherein the indicator indicates that the user device is in communication with the particular cell type.

5. The user device of claim 1, wherein the one or more processors, when performing the action based on the particular cell type and the particular capability, are to:
cause display of information on a display of the user device,
wherein the information concerns the particular capability.

6. The user device of claim 1, wherein the one or more processors, when performing the action based on the particular cell type and the particular capability, are to:
cause display of one or more icons related to the particular cell type and the particular capability.

7. The user device of claim 1, wherein the one or more processors, when performing the action based on the particular cell type and the particular capability, are to:
determine whether to connect to the cell.

8. A method, comprising:
receiving, by a user device, system information block data from a cell;
obtaining, by the user device, cell metadata from the system information block data,
wherein the cell metadata includes a cellular parameter;
parsing, by the user device, the cell metadata to identify the cellular parameter,
wherein the cellular parameter includes a network capability indicator element and at least one of:
a public land mobile network (PLMN) information list element, or
an upper layer indicator element;
determining, by the user device and based on the cellular parameter, that the cell is of a particular cell type of a plurality of cell types, and that the cell has a particular capability of a plurality of types of capabilities,
wherein the plurality of types of capabilities includes:
an enhanced mobile broadband type,
a connected vehicles type,
a real-time service type,
an enhanced multi-media type,
an internet of things type,
an ultra-reliable low latency applications type, or
a fixed wireless access type; and
performing, by the user device, an action based on the particular cell type and the particular capability.

9. The method of claim 8, wherein the upper layer indicator element has an enumerated type data type.

10. The method of claim 8, wherein the upper layer indicator element has a single-element enumerated type data type.

11. The method of claim 8, wherein determining that the cell is of the particular cell type of the plurality of cell types, and that the cell has the particular capability of the plurality of types of capabilities comprises:
determining that the cellular parameter includes the PLMN information list element and that the cellular parameter does not include the upper layer indicator element.

12. The method of claim 8, wherein determining that the cell is of the particular cell type of the plurality of cell types, and that the cell has the particular capability of the plurality of types of capabilities comprises:
determining that the cellular parameter includes the PLMN information list element and the upper layer indicator element.

13. The method of claim 8, wherein performing the action based on the particular cell type and the particular capability comprises:
causing display of a first indicator on a display of the user device,
wherein the first indicator indicates the particular cell type; and
causing display of a second indicator on the display of the user device,
wherein the second indicator indicates the particular capability.

14. The method of claim 8, wherein performing the action based on the particular cell type and the particular capability comprises:
configuring a communication component of the user device based on the particular cell type and the particular capability.

15. A non-transitory computer-readable medium storing instructions, the instructions comprising:
one or more instructions that, when executed by one or more processors, cause the one or more processors to:
receive system information block data from a cell;
obtain cell metadata from the system information block data,
wherein the cell metadata includes a cellular parameter;
parse the cell metadata to identify the cellular parameter,
wherein the cellular parameter includes an upper layer indicator element and a network capability indicator element;
determine, based on the cellular parameter, that the cell is of a particular cell type of a plurality of cell types, and that the cell has a particular capability of a plurality of types of capabilities; and
perform an action based on the particular cell type or the particular capability.

16. The non-transitory computer-readable medium of claim 15, wherein the plurality of types of capabilities concern at least one of:
an area capacity communication capability,
a density communication capability,
a guaranteed minimum data rate communication capability,
a maximum bitrate communication capability,
a relative priority communication capability,
an absolute priority communication capability,
a latency rate communication capability, or
a reliability communication capability.

17. The non-transitory computer-readable medium of claim 16, wherein:
the network capability indicator element is associated with a value; and
the one or more instructions, when executed by the one or more processors, further cause the one or more processors to:
determine that the value associated with the network capability indicator element is associated with the particular capability.

18. The non-transitory computer-readable medium of claim 15, wherein the one or more instructions, that cause the one or more processors to perform the action based on the particular cell type or the particular capability, cause the one or more processors to:
   cause display of an indicator on a display of a user device associated with the one or more processors,
     wherein the indicator indicates the particular capability.

19. The non-transitory computer-readable medium of claim 15, wherein the one or more instructions, that cause the one or more processors to perform the action based on the particular cell type or the particular capability, cause the one or more processors to:
   configure a communication component of a user device associated with the one or more processors based on the particular capability.

20. The non-transitory computer-readable medium of claim 15, wherein the one or more instructions, that cause the one or more processors to perform the action based on the particular cell type or the particular capability, cause the one or more processors to:
   determine whether to connect to the cell based on the particular capability.

\* \* \* \* \*